S. S. TERWILLEGER.
Sulky-Scraper.
No. 202,484. Patented April 16, 1878.
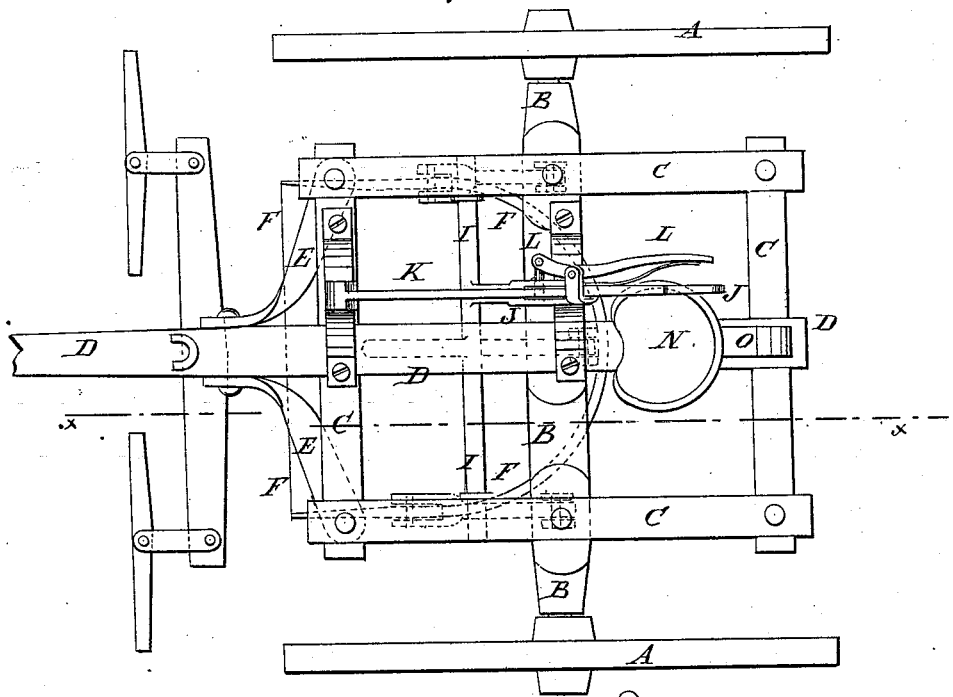
Fig. 1.
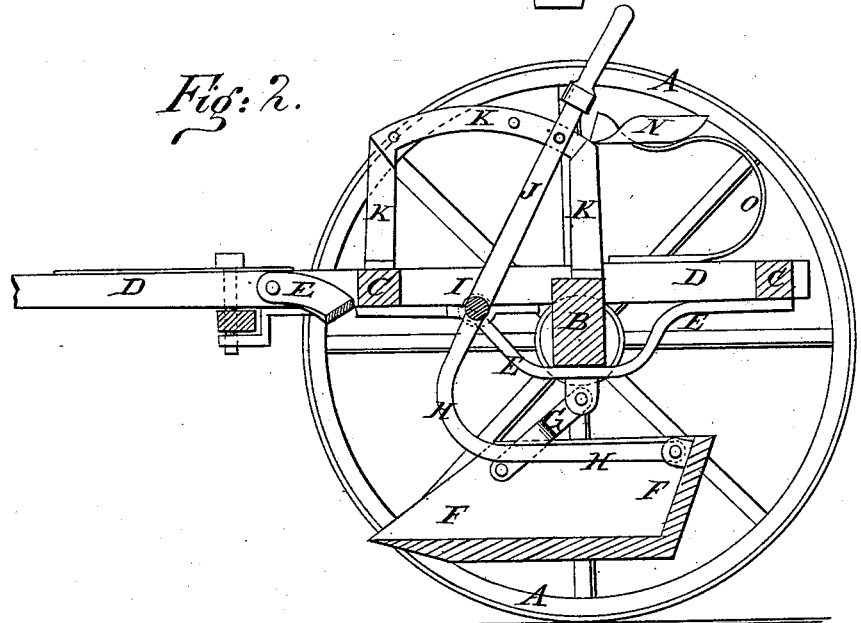
Fig. 2.
Fig. 3.
WITNESSES:
Chas. Nida
Alex F. Roberts
INVENTOR:
S. S. Terwilleger
BY
ATTORNEYS.

UNITED STATES PATENT OFFICE.

STEPHEN S. TERWILLEGER, OF TIE SIDING, WYOMING TERRITORY.

IMPROVEMENT IN SULKY-SCRAPERS.

Specification forming part of Letters Patent No. 202,484, dated April 16, 1878; application filed August 18, 1877.

*To all whom it may concern:*

Be it known that I, STEPHEN SHAFER TERWILLEGER, of Tie Siding, in the county of Albany and Territory of Wyoming, have invented a new and useful Improvement in Sulky-Scrapers, of which the following is a specification:

Figure 1 is a top view of my improved scraper. Fig. 2 is a vertical longitudinal section of the same, taken through the line $x\ x$, Fig. 1. Fig. 3 is a detail sectional view of a modified form of the scraper.

Similar letters of reference indicate corresponding parts.

The object of this invention is to furnish an improved sulky-scraper for grading roads and for the various other uses to which a scraper is applicable, and which shall be simple in construction, convenient in use, effective in operation, and easily controlled.

The invention will first be described in connection with the drawing, and then pointed out in the claim.

A are the wheels, which revolve upon the journals of the axle B. C is the frame, which consists of two side bars, connected at their ends by two cross-bars, and the middle parts of the side bars of which are securely bolted to the end parts of the axle B.

D is the tongue, which is attached to the middle parts of the axle B, and of the cross-bars of the frame C. The connection between the axle B, the frame C, and the tongue D is strengthened by braces E.

F is the scraper, which is hung from the axle B by the bars G, the lower ends of which are pivoted to the forward parts of the sides of the said scraper, and their upper ends are pivoted to lugs attached to the under side of the axle B. To the center of the upper part of the back of the scraper F is pivoted the end of the curved arm or lever H, the other end of which is attached to a shaft, I, that works in bearings attached to the side bars of the frame C. To the shaft I is attached the lower end of a lever, J, that moves along an arched bar, K, and is provided with a spring lever-catch, L, the pin of which enters one or the other of the holes in the bar K, to hold the said lever securely in any position in which it may be placed. The forward end of the arched bar K is attached to the front cross-bar of the frame C, and its rear end is attached to the axle B. In the upper or curved part of the bar K are formed three holes to receive the pin of the lever-catch L, to lock the scraper F in position for scraping, in position for carrying the load, and in position for discharging the load.

In Fig. 3 the scraper F is shown as provided with an adjustable forward part M, the rear edge of the bottom of which is hinged to the forward edge of the bottom of the said scraper F. The sides of the part M overlap the sides of the scraper F, and have curved slots formed in them to receive the clamping-bolts $m'$, which also pass through holes in the sides of the scraper F, so that by loosening the bolts $m'$ the part M may be adjusted to enter the ground to any desired extent.

N is the driver's seat, which is attached to the upper end of the curved standard O. The standard O is elastic, and its lower end is attached to the rear part of the tongue D.

Having thus described my invention, I claim as new and desire to secure by Letters Patent—

A solid one-piece scraper, F, suspended at the front to axle by hinged straps, and at the rear to a crooked bar, H, of rock-shaft I, as shown and described.

STEPHEN SHAFER TERWILLEGER.

Witnesses:
 H. B. NEIL,
 JOHN McGILL.